Patented June 8, 1926.

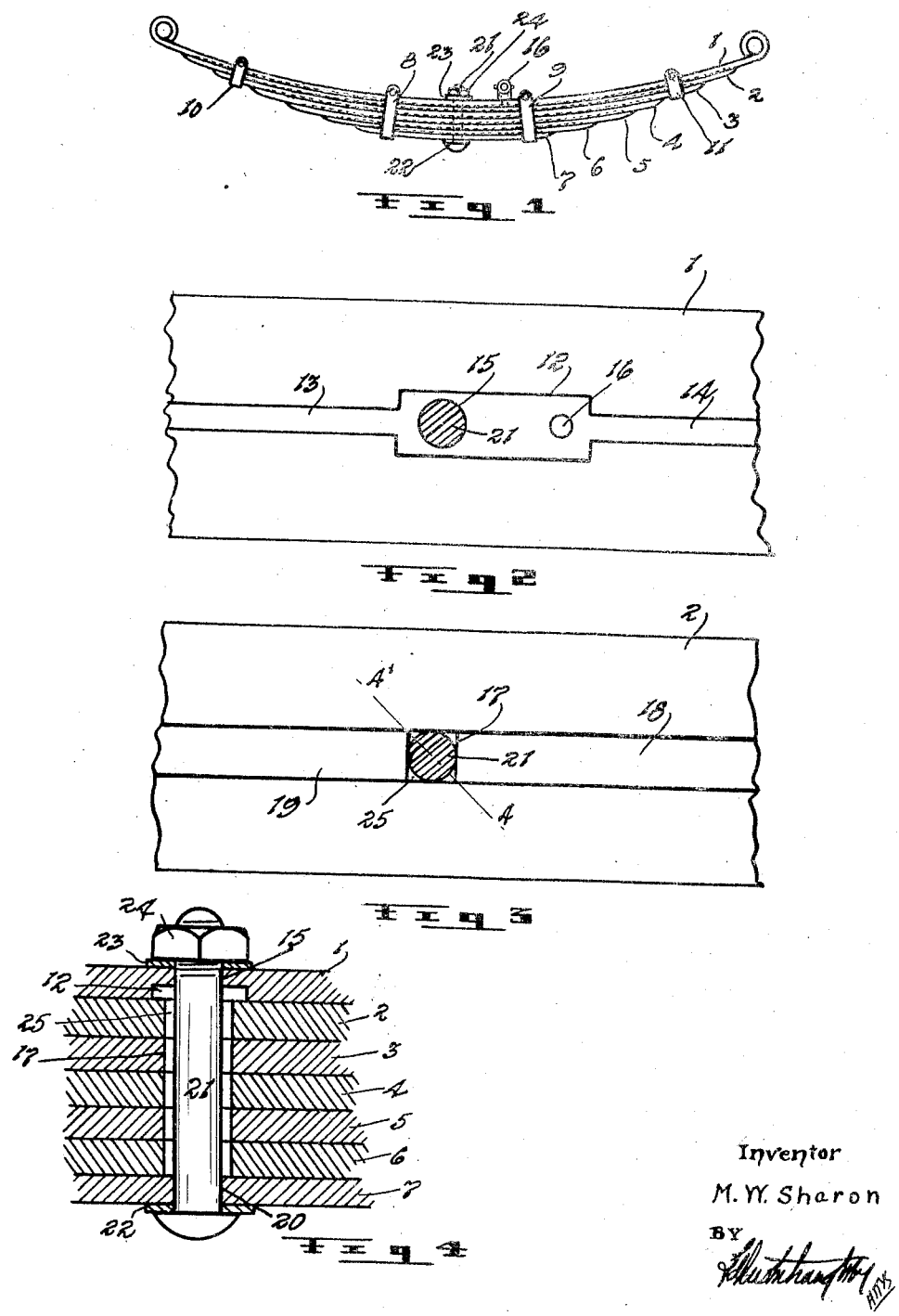

1,587,801

UNITED STATES PATENT OFFICE.

MAURICE W. SHARON, OF REGINA, SASKATCHEWAN, CANADA.

SPRING.

Application filed June 24, 1925. Serial No. 39,322.

The invention relates to improvements in springs and particularly vehicle springs, and an object of the invention is to provide means for lubricating the contacting surfaces of the spring leaves and thus greatly reduce the friction between the said surfaces.

A further object is to provide a self lubricating structure which will embrace the desired features of simplicity, efficiency and durability, which may be manufactured at comparatively small cost and which can be applied to the customary spring leaves without materially altering them.

With the above more important objects in view, the invention consists essentially in the arrangement and construction of parts hereinafter more particularly described, reference being had to the accompanying drawing, in which:

Fig. 1 is a view in side elevation of a spring and embodying my invention.

Fig. 2 is an enlarged detailed, inverted plan view of the central portion of the upper leaf of the spring.

Fig. 3 is an enlarged detailed inverted plan view of the central portion of the intermediate leaves.

Fig. 4 is a vertical cross sectional view at 4—4', Figure 3.

In the drawing like characters of reference indicate corresponding parts in the several figures.

The spring herein shown is formed from seven leaves indicated at 1, 2, 3, 4, 5, 6 and 7, the leaves being all of the same width and having a gradually decreasing length and being held together by the customary clips 8, 9, 10 and 11.

In accordance with my invention the upper leaf is provided on the under side with a lubricant distributing chamber 12, from the ends of which channels 13 and 14 extend outwardly towards the end of the leaf, the channels having their outer ends somewhat short of the underlying ends of the leaf 2. Centrally the upper leaf is provided with a bolt hole 15 which passes through the chamber 12, the chamber being somewhat wider than the diameter of the bolt hole. A filling elbow or nipple 16 is attached to the upper side of the leaf 1 and opens into the chamber 12, this nipple being utilized to fill the various channels of the spring with grease by utilizing a grease gun which is attached to the nipple and is actuated to discharge grease through the nipple into the channels.

The intermediate leaves 2, 3, 4, 5, and 6 are all provided centrally with square bolt holes 17 having a diameter equal to the diameter of the circular hole 15. Lateral channels 18 and 19 are formed also in the under sides of these leaves, the channels having their inner ends terminating at the holes 17 and their outer ends terminating somewhat short of the adjacent ends of the underlying leaf. The lowermost leaf 7 is supplied with a circular bolt hole 20 similar to that 15. The assembled leaves are fastened together by a bolt 21 passing through the round holes 15 and 20 and through the square holes 17, there being washers 22 and 23 on the bolt above and below the spring preventing the escape of the lubricant. When the nut 24, or the bolt is tightened up the springs are obviously fastened together.

As before stated, the lubricant is put in the spring through the nipple by utilizing a grease gun. The lubricant enters the chamber 12 and finds its way out through the channels 13 and 14 and down through the openings indicated at 25 and formed by the right angle corners of the holes 17. It is also forced out by the pressure of the gun into the channels 18 and 19 of the leaves 2 to 6 inclusive. The channels in the top leaf are somewhat narrower than the channels of the underlying leaves, as by so making them more resistance is offered to the grease or lubricant in the upper channels which assures of a better distribution of the lubricant in the lower channels.

This invention will insure of the efficient lubrication of the leaves, and obviously a spring embodying it can be constructed with very little added expense.

What I claim as my invention is:—

1. A lubricated leaf spring comprising, a plurality of superimposed leaves, the uppermost leaf having a lubricant receiving chamber centrally in the under side thereof and channels extending outwardly from the chamber and terminating short of the ends of the underlying leaf and a filling opening passing through the leaf and communicating with the chamber, the intermediate leaves having each a lengthwise extending channel in the under side thereof and terminating short of the ends of the leaf and being provided each with a noncircular hole passing centrally therethrough and a fastening bolt passing centrally through receiving holes provided in the upper and lowermost leaves and through the noncircular holes provided in the intermediate leaves.

2. A lubricated leaf spring comprising, a plurality of superimposed leaves, the upper leaf being provided centrally and at the under side with a lubricant receiving chamber and having channels in the under side of the leaf extending from the chamber outwardly and terminating short of the ends of said leaf and being provided further with a filling opening passing through the leaf and communicating with the chamber and with a circular bolt hole passing therethrough and opening to the chamber, the intermediate leaves being provided centrally with square registering bolt holes and having channels in the under face thereof and extending outwardly from the square bolt holes and terminating short of the ends of the leaves, the under leaf being provided with a circular bolt hole and a fastening bolt passing through all of the bolt holes and fastening the leaves together.

3. In a lubricated spring a plurality of superimposed leaves fastened together by a central bolt circular in cross section, the upper and lowermost leaves being provided with circular holes receiving the bolt and the intermediate leaves being provided with square holes which receive the bolt and provide lubricating receiving corner pockets surrounding the bolt, and all of said leaves with the exception of the bottom leaf being provided in their under sides with lengthwise extending channels communicating with the bolt holes and having their outer ends terminating short of the ends of the respective leaves, and the channel of the upper leaf being centrally enlarged to provide a lubricant receiving chamber and a nipple carried by the top leaf and communicating with the chamber.

Signed at Regina, Saskatchewan, this eighth day of June, 1925.

MAURICE W. SHARON.